United States Patent [19]

Umemura

[11] Patent Number: 4,638,568

[45] Date of Patent: Jan. 27, 1987

[54] METHOD AND APPARATUS FOR MEASURING WALL THICKNESS OF A WORKPIECE

[75] Inventor: Hiroo Umemura, Aichi, Japan

[73] Assignee: Taiho Kogyo Corporation, Ltd., Toyota, Japan

[21] Appl. No.: 696,811

[22] Filed: Jan. 31, 1985

[30] Foreign Application Priority Data

Jan. 31, 1984 [JP] Japan .................. 59-14328

[51] Int. Cl.$^4$ .............................. G01B 7/06
[52] U.S. Cl. .......................... 33/549; 33/573; 33/147 N; 33/143 L
[58] Field of Search ............. 33/147 R, 147 E, 147 L, 33/148 R, 148 E, 148 F, 148 H, 147 N, 143 R, 143 L, 507, 517, 573, 559, 557, DIG. 17, 568, 550, 551, 552, 553, 549

[56] References Cited

U.S. PATENT DOCUMENTS

| | | | |
|---|---|---|---|
| 2,581,219 | 1/1952 | Thorburn | 33/147 E X |
| 3,747,219 | 7/1973 | Moore | 33/560 X |
| 3,750,294 | 8/1973 | Belke et al. | 33/147 L |
| 3,927,476 | 12/1975 | Martin | 33/143 L |
| 3,928,918 | 12/1975 | Morisaki | 33/169 R X |
| 4,403,420 | 9/1983 | Rarick | 33/507 |

*Primary Examiner*—Harry N. Haroian
*Attorney, Agent, or Firm*—Sughrue, Mion, Zinn, Macpeak, and Seas

[57] ABSTRACT

A method and apparatus for measuring the wall thickness of a workpiece in the form of a half cylinder in which inaccuracies in measurement due to variations in height among workpieces are eliminated. The workpieces are mounted with the inner side fitted around a support member in such a manner that the lower legs of the workpiece are separated from the underlying work table. When the workpiece has been so positioned, upper and lower measuring units are moved into abutment with opposite surfaces of the workpiece. Movements of the measuring units are sensed by respective differential transformers, and a thickness measurement is provided accordingly.

20 Claims, 13 Drawing Figures

METHOD AND APPARATUS FOR MEASURING WALL THICKNESS OF A WORKPIECE

BACKGROUND OF THE INVENTION

The present invention relates to a method for measruing the wall thickness of a workpiece which is in the form of a half cylinder and which is formed by dividing a cylinder along its longitudinal axis into two parts. The invention further relates to an apparatus for practicing this method.

Usually, a bearing bushing is manufactured according to a method in which two rectangular plates are bent into two bearing halves each in the form of a half cylinder and the two bearing halves thus obtained are butt-welded. In such manufacture, it is necessary to reject bearing halves which have an unacceptable wall thickness. Accordingly, various methods for measuring the wall thickness of a half-cylinder-shaped workpiece and apparatuses for practicing such methods have been proposed in the art.

A workpiece wall thickness measuring apparatus of this type is disclosed in Japanese Laid-Open Patent Application No. 98352/1975 filed by the present applicant. In this apparatus, a half-cylinder-shaped workpiece is positioned between upper and lower measruing units in such a manner that the inner surface of the workpiece faces downwardly. The upper and lower measuring units are then brought into contact with the workpiece to measure the wall thickness. In this measurement, the lower ends of the legs of the workpiece rest on the measuring table. Therefore, if workpieces set on the measuring table are variable in height, then the operating strokes required for the upper and lower measuring units to contact the various workpieces are also variable. The variations in height of the workpieces may be due to the fact that the rectangular plates from which the workpieces are manufactured are variable in dimensions or the rectangular plates are unsatisfactorily bent.

Measurement of the wall thickness of a workpiece with the upper and lower measuring units is, in general, carried out by detecting the amounts of movement of the measuring units with differential transformers. The differential transformers operate to convert a mechanical displacement into an electrical output signal. Unfortunately, the linear range of the input-output conversion characteristics is generally small for available differential transformers. Therefore, because variations in the measuring units result in variations in operating stroke, sometimes it is impossible using differential transformers to accurately detect the amounts of movements of the measuring units, and accordingly the wall thickness measurement accuracy is sometimes unacceptably low.

SUMMARY OF THE INVENTION

In view of the foregoing, an object of the invention is to provide a wall thickness measuring method in which variations in wall thickness measurement accuracy due to variations in height of half-cylinder-shaped workpieces are prevented.

A further object of the invention is to provide an apparatus for practicing such a method.

The foregoing and other objects are achieved according to the invention by the provision of a wall thickness measuring method in which, with a workpiece held in such a manner that the lower ends of the legs of the workpiece are spaced from the measuring table and the inner surface of the workpiece is at a fixed predetermined height, the upper and lower measuring units are brought into contact with the workpiece.

The above described objects of the invention can further be achieved by the provision of a wall thickness measuring apparatus in which, according to the invention, a supporting block is provided on the measruing table so that the lower ends of the legs of a workpiece positioned between the upper and lower measuring units are spaced from teh measuring table and the inner surface of the workpiece is at a predetermined height.

Because, according to the inventino, a workpiece is held at a predetermined height with the lower ends of the legs thereof spaced from the measuring table, the positions where the upper and lower measuring units are brought into contact with the workpiece are not affected by the height of the workpiece. Accordingly, the operating strokes of the upper and lower measuring units can be set within the range in which wall thicknesses can be measured with high accuracy.

In a preferred embodiment of the invention, in order to prevent the upward movement of a workpiece beyond a predetermined height, the measuring pressure of the upper measuring unit is made larger than that of the lower measuring unit, and the upper measuring unit is moved towards the workpiece earlier than the lower measuring unit. Accordingly, it is unnecessary to provide a special jig for retaining the workpiece.

In the preferred embodiment of the invention, the upper measuring unit and the lower measuring unit are stopped above a workpiece by respective stopping mechanisms, the stopping operations of which are released by the operations of respective cylinder devices. As at least one of the stopping mechanisms adapted to stop the upper and lower measuring units receives the driving force of the cylinder device through a spring, the lower measuring unit can be gently brought into contact with the workpiece, whereby the formation of impressions or scratches on the inner surface of the workpiece by the lower measuring unit is prevented.

Furthermore in the preferred embodiment of the invention, the movements of the upper and lower measuring units are transmitted through levers to respective differential transformers, and accordingly the measuring units can be separated from the differential transformers, as a result of which the installation and replacement of the differential transformers can be readily achieved.

BRIEF DESCRIPTION OF THE DRAWINGS

The foregoing objects and other objects as well as the characteristic features of the invention will become more apparent from the following detailed description when read in conjunction with the accompanying drawings in which.

DESCRIPTION OF THE PREFERRED EMBODIMENTS

Preferred embodiments of the invention will now be described with reference to the accompanying drawings.

Figure 1:
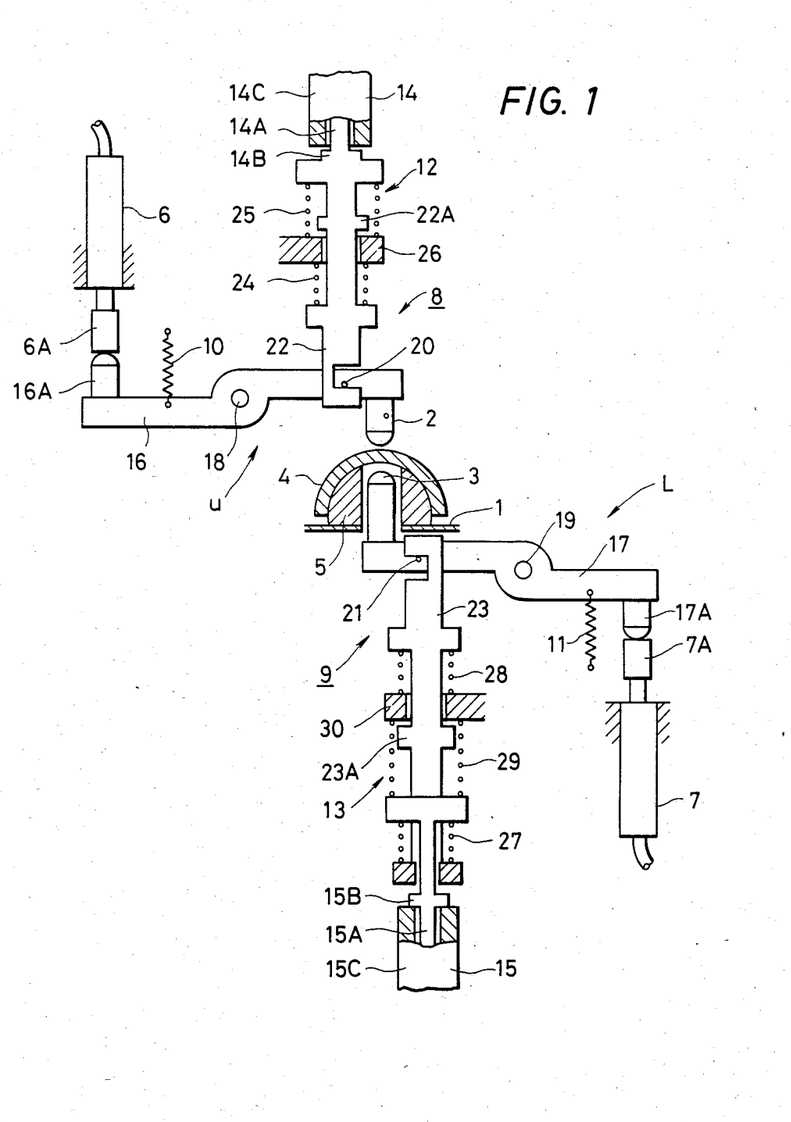
FIG. 1 is a sectional side view showing essential components of a first example of a all thickness measuring apparatus according to the invention.

FIG. 1 is a diagram showing schematically a first embodiment of the invention. In FIG. 1, reference numeral 1 designates a measuring table above which an upper measuring unit U is prodived. A lowermeasuring unit L is provided below the upper measuring unit U. The wall thickness measuring appratus includes a workpiece supplying device (not shown) which moves a workpiece 4 along the measuring table 1 to dispose it between the measuring units U and L. The owrkpiece supplying device may be conventional one; however, a workpiece supplying device of a type disclosed, for instance, by Japanese Laid-Open Patent Application No. 98352/1975 is preferably employed.

The workpiece 4 is moved along the measuring table with its inner surface facing downwardly until it is positioned between the two measuring units U and L. The workpiece sliding surface of the measuring table 1 is preferably made of a hard material to provide it with a high wear resistance. A supporting block 5, detachably mounted on the measuring table 1, is dimensioned so that both curved ends (the lower ends of both legs) of the workpiece 4 positioned between the two measuring units U and L are spaced form the measuring table 1.

The contact tips 2 and 3 of the measuring units U and L are brought into contact with the workpiece 4 supported on the supporting block 5, and the movements of the measuring units U and L are transmitted to the measuring spindles 6A and 7A of differential transformers 6 and 7, respectively, which form part of a counting device. According to the movements of the measuring spindles 6A and 7A, the differential transformers 6 and 7 apply electrical output signals to respective counting circuits (not shown).

In a wall thickness measuring method using the above-described measuring apparatus, the count values provided when the contact tips 2 and 3 are brought into contact with a reference workpiece are taken as reference values (which may, for instance, be taken as zero).

The count values which are produced when the two contact tips 2 and 3 are then brought into contact with a workpiece to be measured are displayed as positive or negative deviations from the reference values by a visual display unit or the like.

The measuring units U and L are operatively coupled to measuring unit drive devices 8 and 9, respectively. The drive devices 8 and 9 are provided with springs 10 and 11, respectively, which push the contact tips 2 and 3 of the measuring units U and L against the workpiece 4. The drive devices 8 and 9 further include stopping mechanisms 12 and 13, respectively, used to stop the measuring units U and L at positions where the contact tips 2 and 3 are removed from the workpiece 4. The stopping mechanisms 12 and 13 perform stopping-/releasing operations in response to the operation of cylinder devices 14 and 15, respectively.

When the workpeice 4 is placed on the supporting block 5, the stopping operations of the stopping mechanisms 12 and 13 are released so that the contact tips 2 and 3 are pushed against the workpiece 4 by the elastic forces of the springs 10 and 11. The elastic force of the spring 10 of the upper measuring unit U, that is, the measuring pressure of the upper measuring unit U, is made larger than the elastic force of the spring 11 of the lower measuring unit L, that is, larger than the measuring pressure of the lower measuring unit L. The difference between the measuring pressures of the two measuring units maintains the workpiece 4 on the supporting block 5.

The stopping/releasing operation of the upper stopping mechanism 12 is executed earlier than that of the lower stopping mechanism 13. Accordingly, the workpiece 4 cannot be moved upwardly by the force of the lower measuring unit L before the upper measuring unit U is brought into contact with the workpiece 4.

The measuring unit drive devices 8 and 9 have levers 16 and 17, respectively. The levers 16 and 17 are rockable about fixedly positioned shafts 18 and 19, respectively. The contact tips 2 and 3 are provided on first ends of the levers 16 and 17, respectively, and anvils 16A and 17A are mounted on the other ends of the levers 16 and 17, respectively. The anvils 16A and 17A are brought into contact with the measuring spindles 6A and 7A of the differential transformers 6 and 7 by the forces of the springs 10 and 11, respectively, so that the movements of the measuring units U and L are transmitted through the levers 16 and 17 to the differential transformers 6 and 7, respectively.

In the measuring apparatus thus constructed, the differential transformers 6 and 7 are provided separately from the corresponding measuring untis U and L, and therefore the mounting and replacement of the differential transformers 6 and 7 can be readily achieved.

The levers 16 and 17 have protrusions 20 and 21, respectively. The stopping mechanisms 12 and 13 have levers 22 and 23 which are engageable with the protrusions 20 and 21, respectively.

In the upper stopping mechanism U, the lever 22 is integral with the movable piston rod 14a of the cylinder device 14. The lever 22 is urged downwardly by a push-down spring 24 and simultaneously pushed upwardly by a push-up spring 25 whose elastic force is larger than that of the push-down spring 24. An upper limit stop portion 14B formed on the movable piston rod 14a abuts against a fixedly positioned housing 14C to thereby set the upper limit position of the operating stroke of the lever 22. When the lever 22 is at the upper limit position of the operating stroke, the protrusion 20 is pulled upwardly by the lever 22 so that the upper measuring unit U is stopped above the workpiece 4. When the lever 22 is moved downwardly by the cylinder device 14 against the elastic force of the spring 25, the lever 22 is disengaged from the protrusion 20 so that the upper measuring unit U becomes movable. As a result, the upper measuring unit U is brought into contact with the upper surface (outer surface) of the workpeice 4. A lower limit stop portion 22A formed on the lever 22 abuts against a fixedly positioned frame 26, thereby to set the lower limit position of the lever 22.

In the lower stop mechanism L, the lever 23 is coupled through a shock absorbing spring 27 to the movable piston rod 15A of the cylinder device 15. The lever 23 is urged upwardly by a push-up spring 28 while simultaneously being pushed downwardly by a push-down spring 29 whose elastic force is larger than that of the push-up srping 28. A lower limit stop portion 15B formed on the movable piston rod 15A abuts against a fixedly positioned housing 15C thereby to set the lower limit position of the operating stroke of the lever 23. When the lever 23 is at the lower limit position, the protrusion 21 is pushed downwardly, as a result of which the lower measuring unit L is stopped below the workpiece 4. When the piston rod 15A is pushed upwardly against the elastic force of the spring 29 by the cylinder device 15, the lever 23 is pushed upwardly by the force of the push-up spring 28 so that the lever 23 is disengaged from the protrusion 21 and the measuring unit L becomes movable. As a result, the measuring unit L is brought into contact with the middle of the inner surface of the workpiece 4 by the spring 11. An upper limit stop member 23A, formed on the lever 23, abuts against a fixedly positioned frame 30, thereby to set the upper limit position of the lever 23. In the case where the workpiece 4 is to be formed into a bearing bushing, the inner surface of the workpiece 4 is made of soft material, and therefore it is necessary to bring the contact tip 3 of the lower measuring unit L into contact with theinner surface of the workpiece 4 as gently as possible. In the measuring apparatus thus constructed, the mechanical shock applied to the movable piston rod 15A when the cylinder device 15 is driven is absorbed by the spring 27, and therefore no impressions or scratches are formed on the inner surface of the workpiece 4.

FIGS. 2 through 9 show a second embodiment of the invention. As shown in these figures, a wall thickness measuring apparatus body 40 has a fixedly positioned measuring table 1. Two upper measuring units U are provided above the measuring table 1, and two lower measuring units L are provided below the upper measuring units 2. A workpiece 4 in the form of a half cylinder is set between the two pairs of measuring units U and L by a workpiece supplying device (not shown) in such a manner that its inner face is directed downwardly.

Figure 2:
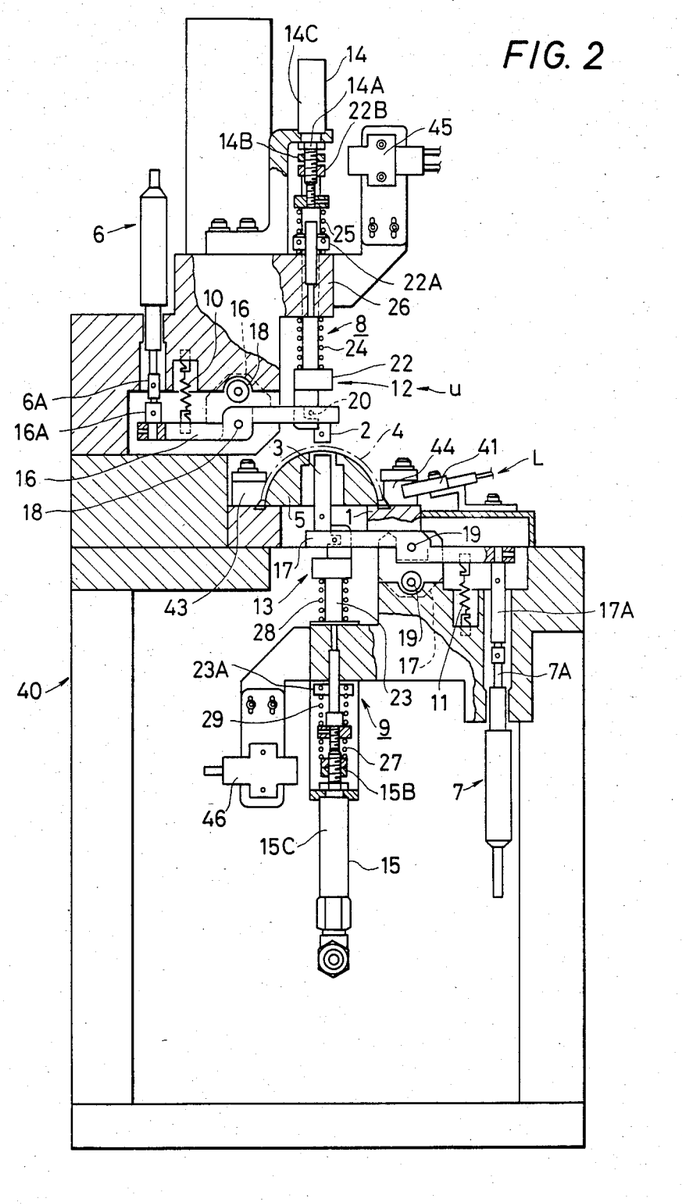
FIG. 2 is a sectional side view showing essential components of a second example of a wall thickness measuring apparatus according to the invention.

A supporting block 5 for supporting the inner surface of the workpiece 4 is fixedly mounted on the measuring table 1 so that the lower ends of the workpiece 4 placed between the two pairs of measuring units U and L are spaced away from the measuring table 1. Between the two pairs of measuring units U and L, the supporting block 5 has a holding surface 5A which is substantially similar to the inner surface of the workpiece 4. In the case where the workpiece 4 is in the form of a rectangular gutter U-shaped in section, it is desirable that the holding surface 5A also be U-shaped in section.

Figure 3:
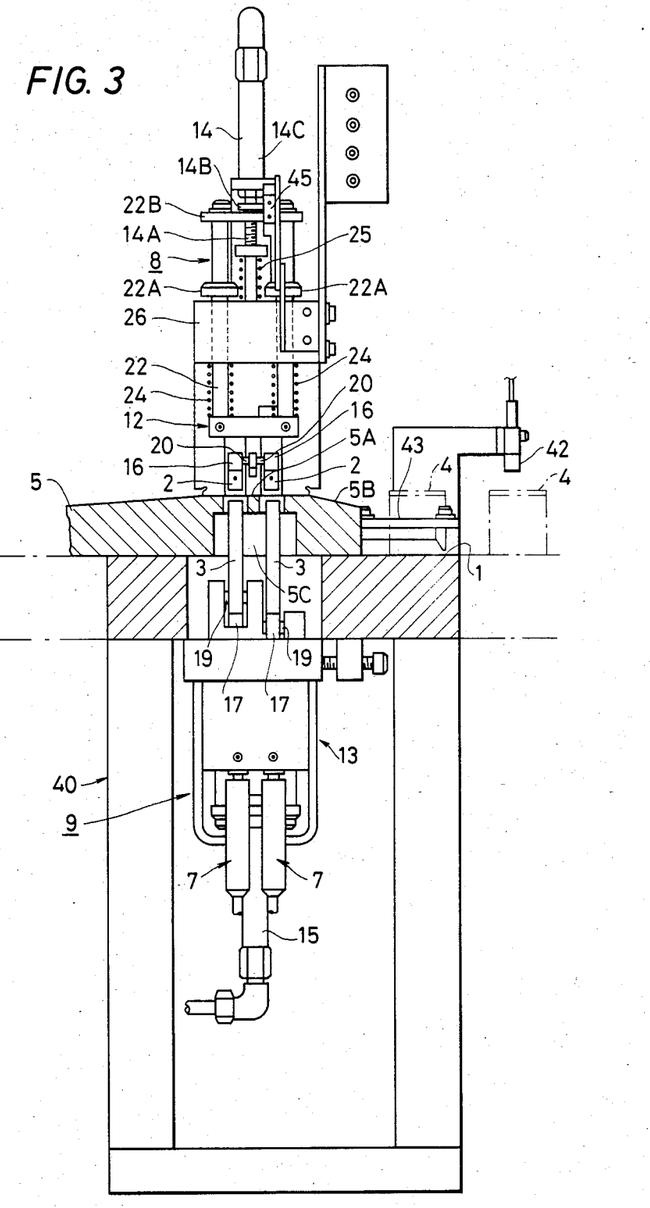
FIG. 3 is a sectional front view showing essential components of the apparatus shown in FIG. 2.
Figure 4:
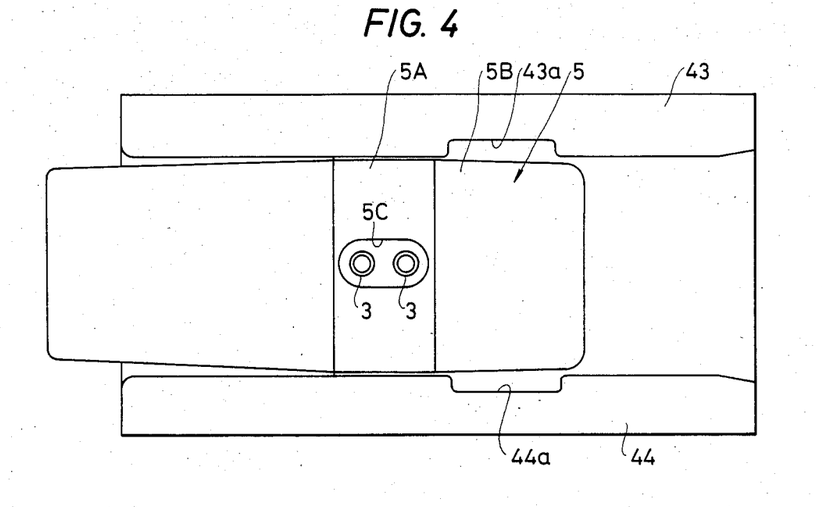
FIG. 4 is a plan view showing a supporting block in the apparatus shown in FIG. 2.
Figure 5:
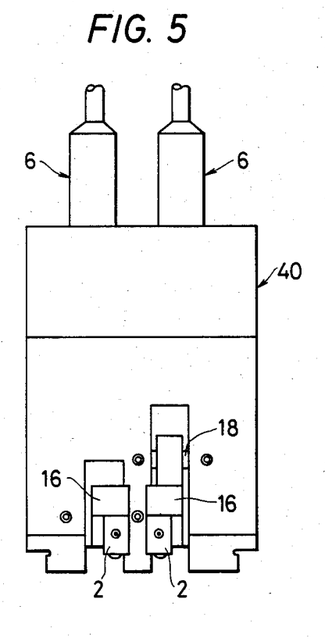
FIG. 5 is a front view showing upper measuring units and related components in the apparatus shown in FIG. 2.
Figure 6:
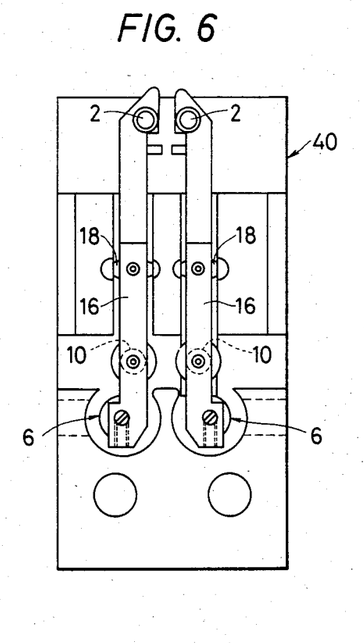
FIG. 6 is a bottom view showing the upper measuring units and associated components in the apparatus shown in FIG. 2.
Figure 7:
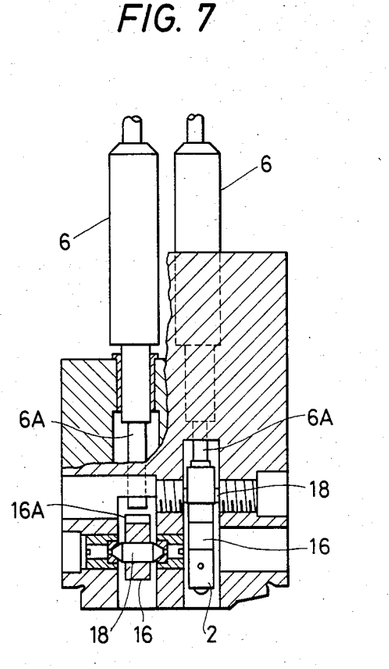
FIG. 7 is a sectional front view showing essential components associated with the upper measuring units in the apparatus in FIG. 2.

The supporting block 5, as shown in FIGS. 3 and 4, slopes inwardly and downwardly at both ends, in the longitudinal direction, from the holding surface 5A. In FIG. 3, the workpiece 4 is moved along the measuring table 1 from the right-hand side of the measuring apparatus and engaged with the right-hand end of the supporting block 5. The workpiece 4 is further moved along the inclined guide surface 5B towards the holding surface 5A, thus leaving the measuring table 1. When the workpiece 4 reaches a predetermined measuring position between the upper and lower measuring units U and L, that is, when the workpiece 4 is properly positioned on the holding surface 5A of the supporting block 5, a sensor, namely, an optical switch 41 (FIG. 2), detects the presence of the workpiece 4 on the holding surface 5A and generates a signal which stops the movement of the workpiece 4.

A sensor (or an optical switch) 42 for confirming the receipt of a workpiece is provided on the right-hand side of the supporting block 5, that is, on the upstream side of the workpiece supplying path. After the wall thickness of the workpiece 4 on the supporting block 5 has been measured, the next wall thickness measurement cannot be carried out until the next workpiece 4 is detected by the optical switch 42. Thus, measurement of the same workpiece twice is prevented.

The supporting block 5 has an opening 5C in its holding surface through which the contact tips 3 of the lower measuring units L are exposed upwardly. Workpiece guide members 43 and 44 are provided on opposite sides of the supporting block 5. The workpiece guide members 43 and 44 cooperate with the supporting block 5 to guide the lower end portions of the legs of the workpiece 4 and to prevent upward movement of the workpiece 4. The workpiece guide members 43 and 44 are detachably secured to the measuring table 1 with bolts. The workpiece guide members 43 and 44 are designed so that, as shown in FIG. 2, they slightly cover the lower end portions of the legs of the workpiece 4. As shown in FIG. 4, workpiece removing recesses 43a and 44a are formed in the inner surfaces of the workpiece guide members 43 and 44, respectively, opening upwardly. A reference workpiece (or a master gauge) can be mounted on the supporting block 5 through the workpiece removing recesses 43a and 44a, and can be removed therefrom through the same workpiece removing recesses.

The contact tips 2 and 3 of the upper measuring units U and the lower measuring units L are brought into contact with the workpiece 4 on the supporting block 5, and the movements of the upper and lower measuring units U and L are transmitted to the measuring spindles 6A and 7A of two pairs of upper and lower differential transformers 6 and 7, respectively, whcih form part of a counting mechanism. The differential transformers 6 and 7 apply electrical output signals corresponding to the movements of the measuring spindles 6A and 7A to respective counting circuits (not shown). In the above-described measuring apparatus, the count values provided when the contact tips of the upper and lower measuring units U and L abut against the reference workpiece are initially set to reference values (zero, for instance), and the count values provided when the contact tips 2 and 3 are brought into contact with a workpiece to be measured are displayed as positive or negative deviations from the initially set values by a visual display unit or the like.

Since the contact tips 2 and 3 of the upper and lower measuring units U and L can be brought into contact with both end portions (in the axial driection) of the workpiece 4, the cone angle of the workpiece 4 can be measured. Accordingly, a mechanism for classifying the workpiece as unacceptable when the wall thickness or cone angle thus measured is out of the allowable range can easily be provided with the invention.

The upper and lower measuring units U and L are operatively coupled to upper and lower measuring unit drive devices 8 and 9, respectively. The upper measuring unit drive device 8 has springs 10 which push the contact tips 2 against the upper surface of a workpiece 4. The drive device 8 is further provided with a stopping mechanism 12 for stopping the two upper measuring units U above the workpiece 4. When the stopping operation of the stopping mechanism 12 is released, the contact tips 2 of the upper measuring units U are moved downwardly by the forces of the springs 10.

The upper measuring unit drive device 8 has two levers 16 which are rockable about corresponding shafts 18 fixedly positioned on the body 40. The contact tips 2 are provided on first ends of the levers 16, and two anvils 16A are provided on the remaining ends of the levers 16. The anvils 16A are abutted against the measuring spindles 6A of the differential transformers 6 by the elastic forces of the respective springs 10. Therefore, the movements of the upper measuring units U are transmitted through the levers 16 to the respective differential transformers 6.

The levers 16 have protrusions 20. The stopping mechanism has a lever 22 which can be engaged with the two protrusions 20 simultaneously. The lever 22 is integrally coupled to the movable piston rod 14A of a cylinder device 14, as indicated at 22B. The lever 22 is urged downwardly by two push-down springs 24. However, the lever 22 together with the movable piston rod 14A are simulataneously urged upwardly by a push-up spring 25 whose elastic force is much larger than the sum of the elastic forces of the two push-down springs 24.

An upper limit stop portion 14B formed on the movable piston 14a abuts against the lower end of the fixedly positioned housing 14C of the cylinder device 14 to set the upper limit position of the lever 22. When the lever 22 is at the upper limit position, the protrusions 20 of the levers 16 are pulled upwardly by the lever 22, and accordingly the upper measuring units U are held above the workpiece 4. A sensor, namely, an optical switch 45 (FIG. 2), is provided to detect whether or not the lever 22 has reached the upper limit position, that is, whether or not the upper measuring units U are maintained stopped.

When the lever 22 is moved downwardly by the operation of the cylinder device 14 against the force of the spring 25, the lever 22 is disengaged from the protrusions 20 so that the upper measuring units U become movable. As a result, the contact tips of the upper measuring units U are brought into contact with the upper surface of the workpiece 4 by the forces of the springs 10. The lever 22 has lower limit stop portions 22A which abut against a fizedly positioned frame 26 to set the lower limit position of the lever 22. FIGS. 2 and 3 show the upper measuring units U unlocked and the lever 22 set at the lower limit position.

The lower measuring unit drive device 9 has springs 11 which push the contact tips 3 of the lower measuring units L against the inner surface of the workpiece 4. The drive device 9 has a stopping mechanism 13 for stopping the two measuring units L below the workpiece 4. The stopping operation of the stopping mechanism 13 is released by the operation of a cylinder device 15. When the stopping operation of the stopping mechanism 13 is released, the contact tips 3 of the lower measuring units L are pushed against the inner surface of the workpiece 4 by the force of the respective springs 11.

The lower measuring unit drive device 9 has two levers 17 which are rockable about shafts 19 fixedly secured to the measuring apparatus body 40. The lower measuring units L areprovided on the remaining ends of the levers 17. The anvils 17A are brought into contact with the measuring spindles 7A of the differential transformers 7 by the elastic forces of the corresponding springs 11. Therefore, the movements of the lower measuring units L are transmitted through the levers 17 to the differential transformers 7.

Figure 8:
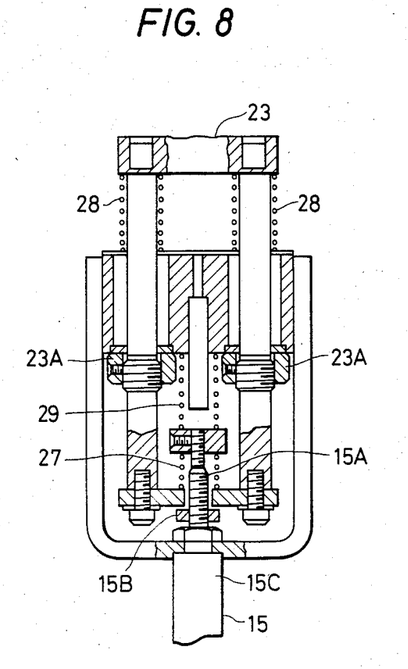
FIG. 8 is a sectional front view showing a lower measuring unit drive device in the apparatus shown in FIG. 2.
Figure 9:
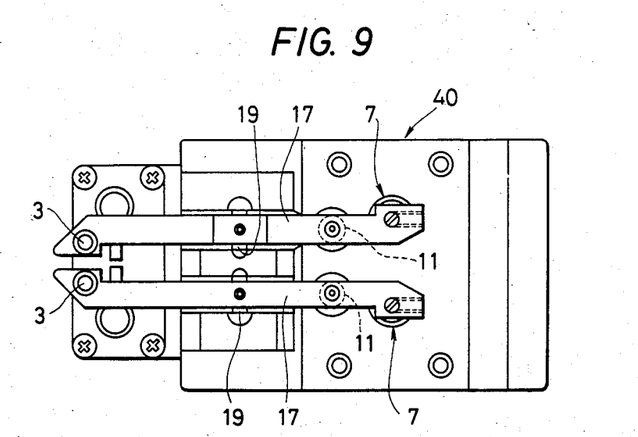
FIG. 9 is a plan view showing lower measuring units and associated components in the apparatus of FIG. 2.

The levers 17 have protrusions 21, and the stopping mechanism 13 has a lever 23 which can be engaged with the two protrusions 21 simultaneously. The lever 23, as shown in FIG. 8 in detail, is coupled through a shock absorbing spring 27 to the movable piston rod 15A of the cylinder device 15. The lever 23 is urged upwardly by two push-up springs 28, while simultaneously the lever 23 together with the movable piston rod 15A is maintained pushed downwardly by a spring 29 whose spring force is much larger than the sum of the force of the springs 28.

A lower limit stop portion 15B on the movable piston rod 15A abuts against the upper end of a fixedly positioned housing 15C to set the lower limit position of the lever 23. When the lever 23 is at the lower limit position, the protrusions 21 of the levers 17 are pushed downwardly by the lever 23 so that the contact tips 3 of the lower measuring units L are held below the workpiece 4. A sensor, namely, an optical switch 46 (FIG. 2), is provided to detech whether or not the lever 23 has reached its lower limit position, that is whether or not the lower measuring units L are held stopped.

when the movable piston rod 15A is moved upwardly by operation of the cylinder device 15 against the force of the spring 29, the lever 23 is also moved upwardly by the springs 28 with the aid of the spring 27. As a result, the lever 23 is disengaged from the protrusions 21 and the contact tips 3 of the lower measuring units L are gently brought into contact with the inner surface of the workpiece 4. This is very advantageous because, in the case where the workpiece 4 is a bearing material, no impressions are formed on the inner surface of the workpiece 4.

The lever 23 has an upper limit stop portion 23A which abuts against a fizedly positioned frame 30 to set the upper limit position of the lever 23. FIGS. 2 and 3 show the lower measuring units L in the state in which they have become movable. In FIGS. 2 and 3, the lever 23 is at its upper limit position.

The forces of the springs 10 acting on the upper measuring units U, which establish the measuring pressures of the upper measuring units U, should be made larger than the forces of the springs 11 acting on the lower measuring units L, which establish the measuring pressures of the lower measuring units L. In addition, the upper measuring units U should be moved earlier than the lower measuring units L so that the upper measuring units U contact the workpiece 4 earlier than the lower measuring units L. As a result, upward movement of the workpiece 4 from the supporting block 5 can be completely prevented.

Figure 10:
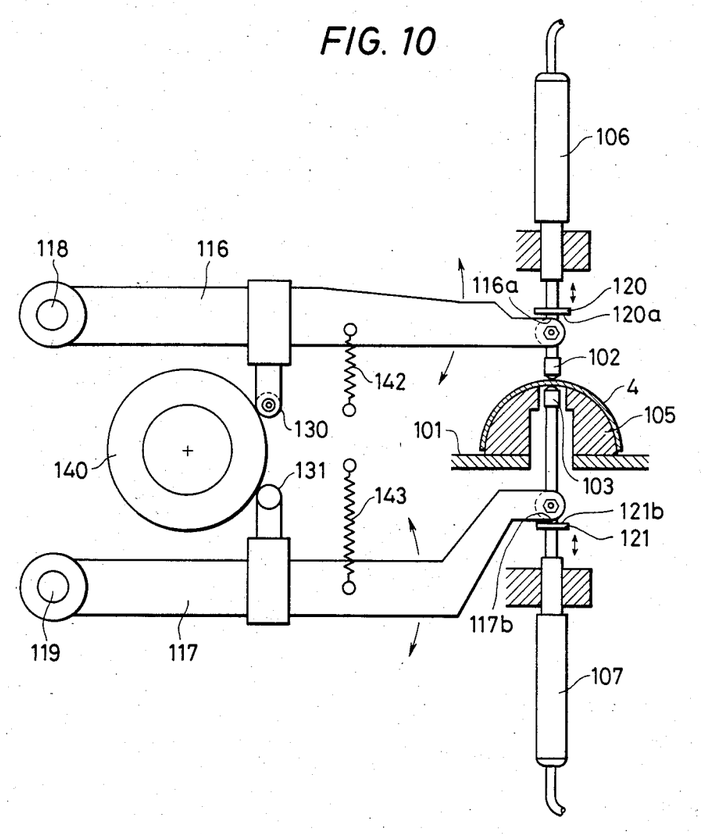
FIG. 10 is a sectional side view showing essential components of a third example of a wall thickness measurin gapparatus according to the invention.
Figures 11A, 11B:
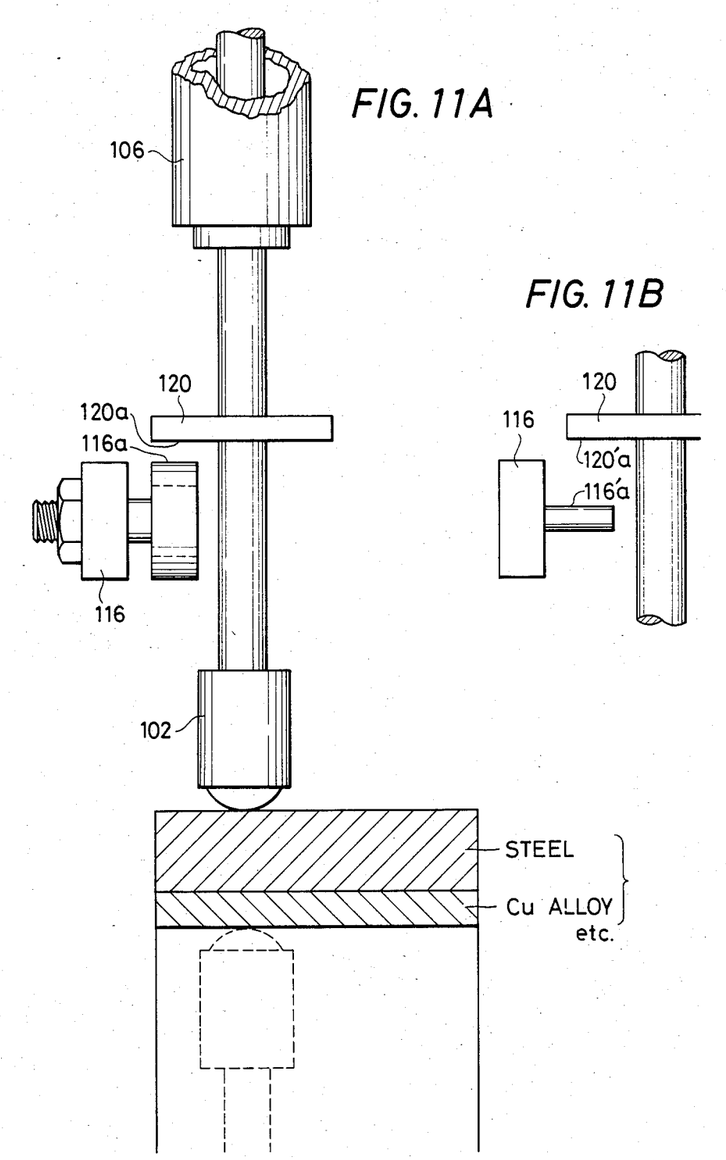
FIG. 11A is an end view of a portion of the apparatus of FIG. 10.
FIG. 11B shows a modification of the arrangement of FIG. 11A.

A third embodiment of the invention is shown in the sectional side view of FIGS. 10 and 11A. In this embodiment, an upper arm 116 is pivotally connected at one end to a fulcrum 118. A cam follower 130, fixed to a central part of the upper arm 116, rides upon a rotary cam 140. A spring 142 pulls the upper arm 116 downwardly so that the cam follower 130 is held in abutment with the surface of the cam 140. The upper surface of a cam follower 116a attached to the free end of the arm 116 buts the lower surface 120a of an upper ring 120 fixsed to the lower end of the measuring spindle of an upper differential transformer 106 as seen most clearly in FIG. 11A. A contact tip 102 is mounted on the lower end of the measuring spindle.

Similarly, a lower arm 117, pivoted at one end at a fulcrum 119, has a cam follower 113. A spring 143, having a spring force less than that of the spring 142, holds the cam follower 131 in abutment with the surface of the cam 140 (cam 140′). The lower surface of a cam follower 117b attached to the free end of the arm 117 contacts the upper surface of 121b of a lower ring 121 fixed to the measuring spindle of a lower differential transformer 107. A contact tip 103 is fixed to the lower end of this measuring spindle.

If desired, the cam follower 116a can be replaced by a simple pin 116′a as shown in FIG. 11B. The same applied as well for the cam follower 117a. Alternatively, the free end 116 may directly abut the lower surface 120a of the upper ring 120.

The structure for mounting a workpiece 4 is similar to that shown in the previously described embodiments, including a supporting block 105 which is dimensioned to keep the lower ends of the legs of the workpiece 4 off the measuring table 1.

In operation, with a workpiece 4 positioned properly on the supporting block 105, as the cam 140′ rotates, first, the upper arm 116 is rotated in the clockwise direction in the drawing so as to bring the contact tip 102 into contact with the upper surface of the workpiece 4. Then, the contact tip 103 attached to the measuring spindle of the lower differential transformer 107 is imilarly brought into engagement with the lower surface of the workpiece 4 below the measuring unit 102. Movement of the measuring spindles of the differential transformers 106 and 107 follows the movement of the contact tips 102 and 103, and the measurement of the thickness of the workpiece 4 is consequently carried out in the manner described with respect to the first and second embodiments.

Figure 12:
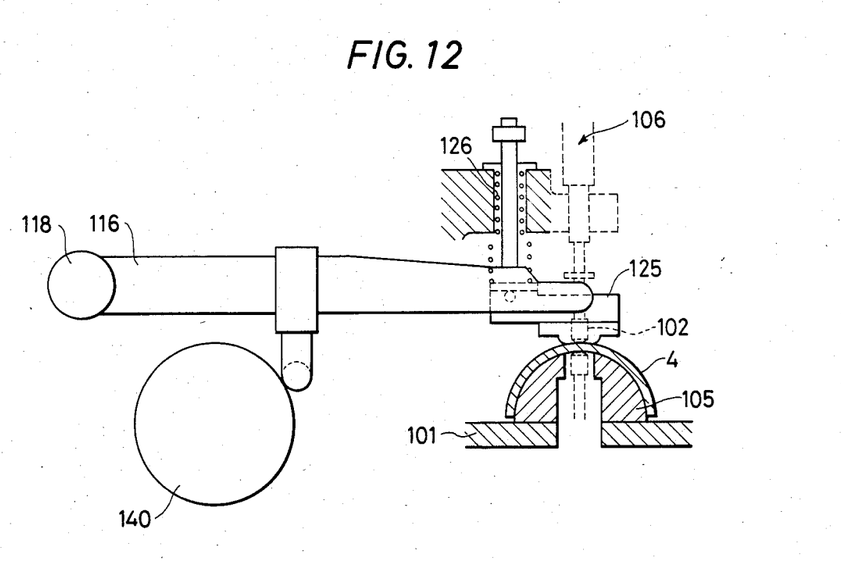
FIG. 12 is a sectional side view showing essential components of a fourth example of a wall thickness measuring apparatus according to the invention.

Referring now to FIG. 12, a modification of the arrangement of FIG. 10 is shown. In this embodiment, a workpiece pressing unit 125 is added to the arrangement of FIG. 10. The workiece pressing unit 125 includes a block member having two protections and a compression-type coil spring 126. The provision of this pressing member prevents the workpiece 4 from moving when the contact tips 102 and 103 engage therewith. If desired, the workpiece pressing unit 125 can be mounted on the arm 116 via the spring 126.

The operation of the device shown in FIG. 12 is substantially the same as that of the FIG. 10 embodiment.

While several embodiments of the invention have been described, it is particularly understood that the invention is not limited thereto or thereby. That is, it will be evident to those skilled in the art that various changes and modifications can be made without departing from the inention within the true spirit and scope of the invention.

As is apparent from the above description, according to the method and the apparatus of the invention, a workpiece in the form of a half cylinder is held at a predetermined height with its lower ends spaced from the measuring table. Therefore, the positions where the upper and lower measuring units contact the workpiece are not affected by the height of the workpiece. Accordingly, the operating strokes of the upper and lower measuring units can be set within the range inwhich wall thickness measurements can be achieved with high accuracy.

I claim:

1. a device for measuring the wall thickness of a workpiece in the form of a half cylinder, comprising:
   a measuring table; a block for supporting said workpiece above said measuring table insuch a manner that an inner surface of said workpiece is directed towards said measuring table and lower legs of said workpiece are spaced from said measuring table, said block having a supporting surface with a curved shape substantially similar in shape to said inner surface of said workpiece; an upper measuring unit for determining the position of an upper surface of said workpiece; a lower measuring unit for determing in the position of said inner surface of said workpiece; and means, responsive to the positions determined by said first and second measuring units, for determining the wall thickness of said workpiece.

2. The device as claimed in claim 1, wherein said supporting block has end portions tapered inwardly.

3. The device as claimed in claim 2, further comprising a pair of workpiece guide members disposed on opposite sides of said supporting block for guiding lower end portions of said legs of said workpiece and preventing upward movement of said workpiece.

4. The device as claimed in claim 1, wherein said supporting block has an opening therethrough through which a contact tip of said lower meauring unit passes to engage with said inner surface of said workpiece.

5. The device as claimed in claim 1, wherein each of said measuring units comprises spring means for urging the respective measuring unit into abutment with a respective surface of said workpiece, a spring force urging said upper measuring unit into abutment with said upper surface of said workpiece being greater than a spring force urging said lower measuring unit into engagement with an inner surface of said workpiece.

6. The device as claimed in claim 1, wherein each of said measuring units comprises a pivotally mounted lever having ac ontact tip at a first end thereof disposed at a position to contact said workpiece at a predetermined position on a surface of said workpiece, a spring for urging said lever to turn in a direction such that said contact tip is pressed against said workpiece, and an anvil at a second end thereof disposed to abut a measuring spindle of a respective differential transformer.

7. The device as claimed in claim 1, wherein each of said upper and lower measuring units comprises a lever pivotally mounted at one end having a contact tip at a second end thereof disposed to abut against a respective surface of said workpiece at a predetermined position, a spring for biasing said lever so as to urge said contact tip into abutment with said workpiece, and a cam follower, and further comprising a rotary cam having a cam surface in abutment with said cam followers of both said upper and lower measuring units.

8. The device as claimed in claim 6, further comprising a second said upper measuring unit and a second said lower measuring unit.

9. The device as claimed in claim 6, wherein said lever is pivotally mounted at substantially a central portion thereof.

10. The device as claimed in claim 6, wherein said upper measuring unit is provided with two contact tips for contacting said upper surface of said workpiece at two spaced positions.

11. A device for measuring the wall thickness of a workpiece in the form of a half cylinder, comprising:
   a measuring table;
   a block for supporting said workpiece above said measuring table in such a manner that an inner surface of said workpiece is directed towards said measuring table and lower legs of said workpiece are spaced from said measuring table;
   an upper measuring unit for measuring a first distance, a lower measuring unit for measuring a second distance, said upper and lower measuring units comprising spring means for urging a respective one of said measuring units into abutment with a respective surface of said workpiece, a spring force urging said upper measuring unit into abutment with said upper surface of said workpiece being greater than a spring force urging said lower measuring unit into abutment with an inner surface of said workpiece; and
   means for determining the wall thickness of said workpiece in accordance with said first and second distances measured by said upper and lower measuring units.

12. The device as claimed to claim 11, wherein each of said measuring units further comprises a lever pivotally mounted at substantially a center portion thereof, a contact tip fixed to a first end of said lever and positioned so as to abut a predetermined position on a workpiece positioned on said supporting block, and means for spring-biasing said lever so as to urge said measuring tip into abutment with a workpiece and a second end of said lever into abutment with an end of a measuring spindle of a respective differential transformer.

13. The device as claimed in claim 12, further comprising upper and lower drive devices provided for said upper and lower measuring units, respectively, each of said drive devices comprise means for selectively retracting the respective measuring unit from said workpiece and releasing said measuring unit to engage with and measure the thickness of said workpiece.

14. The device as claimed in claim 13, wherein each of said drive devices comprises a cylinder device having an operation piston rod, a sliding lever having a first end coupled to said piston rod and a second end engageable with a protrusion of the lever of the respective measuring unit, spring means for urging said sliding lever in the direction of workpiece, and means for determining a range of movement of said sliding lever.

15. The device as claimed in claim 14, wherein said means for determining said range of movement of said sliding lever comprises portions provided integrally with said sliding lever, and at least one fixed abutment member positioned relative to said stop portion to determine said range of movement.

16. A method for measuring the wall thickness of a workpiece having the form of a half cylinder, comprising the steps of:
   positining said workpiece with an inner surface thereof facing downwardly and with lower legs of said workpiece spaced away from an underlying surface; bringing an upper measuring unit into contact with an upper, outer surface of said workpiece; and bringing a lower measuring unit into contact with a lower, inner surface of said workpiece,
   wherein a pressure exerted by said lower measuring unit when in contact with said workpiece is lower than that exerted by said upper measuring unit when in contact with said workpiece.

17. The method as claimed in claim 16, further comprising the steps of determining amounts of movements of said upper and lower measuring units when being brought into contact with said workpiece relative to reference values.

18. The method as claimed in claim 16, wherein said upper measuring unit is brought into contact with said upper, outer surface of said workpiece before said lower measuring unit is brought into contact with said lower, inner surface of said workpiece.

19. A method for measuring the wall thickness of a workpiece having the form of a half cylinder, comprising the steps of:
   positioning said workpiece with an inner surface thereof facing downwardly and with lower legs of said workpiece spaced away from an underlying surface;
   bringing a first measuring unit into contact with an upper surface of said workpiece by pivoting a first lever having a portion engaging with a respective separately mounted differential transformer unitl a contact part of said first measuring unit touches said upper surface of said workpiece;
   bringing a second measuring unit into contact with a lower surface of said workpiece by pivoting a second lever having a portion engaging with a respective separately mounted differential transformer until a contact part of said second measuring unit touches said lower surface of said workpiece; and
   determining amounts of movements of said first and second measuring units when said measuring units are being brought into contact with said workpiece relative to reference values.

20. The method as claimed in claim 19, further comprising the steps of locking each of said measuring units in a stopped position disengaged from said workpiece following a thickness measurement of said workpiece, removing said workpiece, replacing said workpiece with a new workpiece, and, releasing the stopped states of said measuring units.

* * * * *